Figure 1:
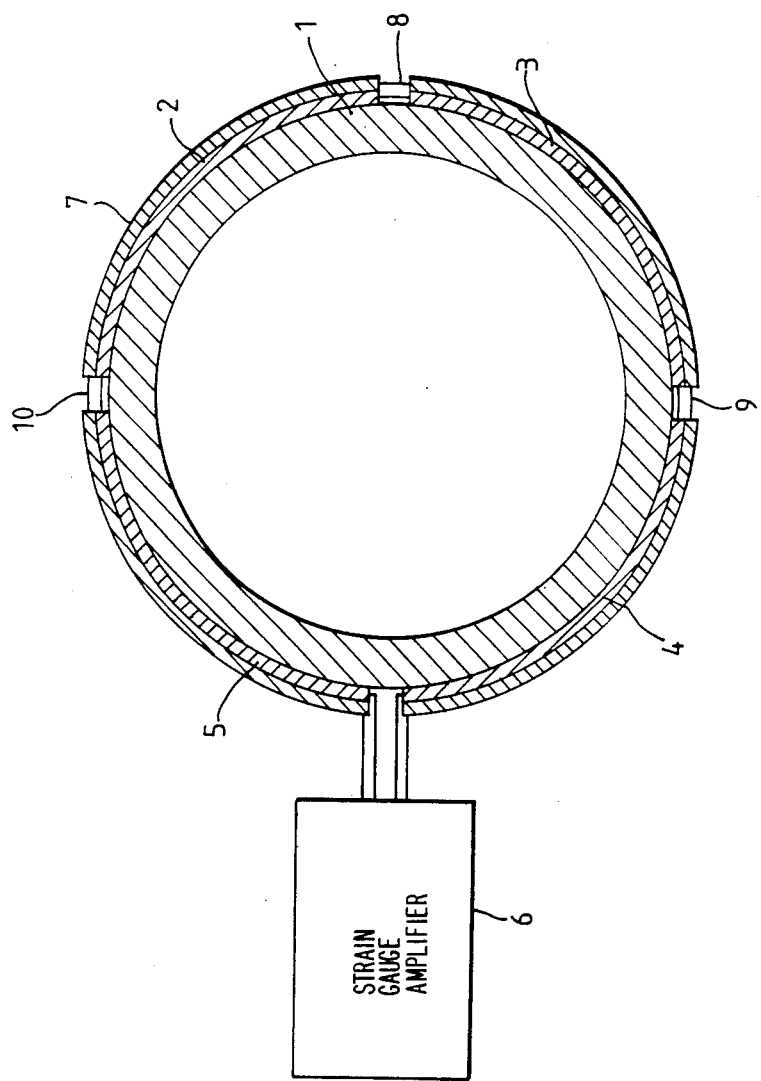

United States Patent [19]

Atkinson et al.

[11] Patent Number: 4,706,501
[45] Date of Patent: Nov. 17, 1987

[54] DETECTION OF STEP CHARGES OF PRESSURE IN VESSELS AND APPARATUS THEREFOR

[75] Inventors: Peter Atkinson, Great Ayton; Bernard D. Allan, Thornaby, both of England

[73] Assignee: Imperial Chemical Industries PLC, London, England

[21] Appl. No.: 319,674

[22] Filed: Nov. 9, 1981

[30] Foreign Application Priority Data

Nov. 21, 1980 [GB] United Kingdom ............ 8037400
Mar. 19, 1981 [GB] United Kingdom ............ 8108708
Sep. 9, 1981 [GB] United Kingdom ............ 8127300

[51] Int. Cl.⁴ .................................................. G01L 7/02
[52] U.S. Cl. ........................................ 73/730; 73/40.5 R
[58] Field of Search ................... 73/40.5 R, 730, 37.5

[56] References Cited

U.S. PATENT DOCUMENTS

| 3,603,152 | 9/1971 | Alibert et al. | 73/730 X |
| 3,898,885 | 8/1975 | Russell | 73/730 |
| 4,174,637 | 11/1979 | Mulzet et al. | 73/730 |
| 4,194,401 | 3/1980 | Claassen et al. | 73/730 |

Primary Examiner—Stewart J. Levy
Assistant Examiner—Joseph W. Roskos
Attorney, Agent, or Firm—Cushman, Darby & Cushman

[57] ABSTRACT

Detectors for monitoring step changes of pressure in a vessel, for example a pipeline, include sensors outside the vessel for detecting a change in its dimensions resulting from a fall in pressure occurring at a minimum rate of 0.005 bars per second which is not followed by a corresponding rise in pressure within 0.05 seconds. They are useful in detecting leaks.

7 Claims, 3 Drawing Figures

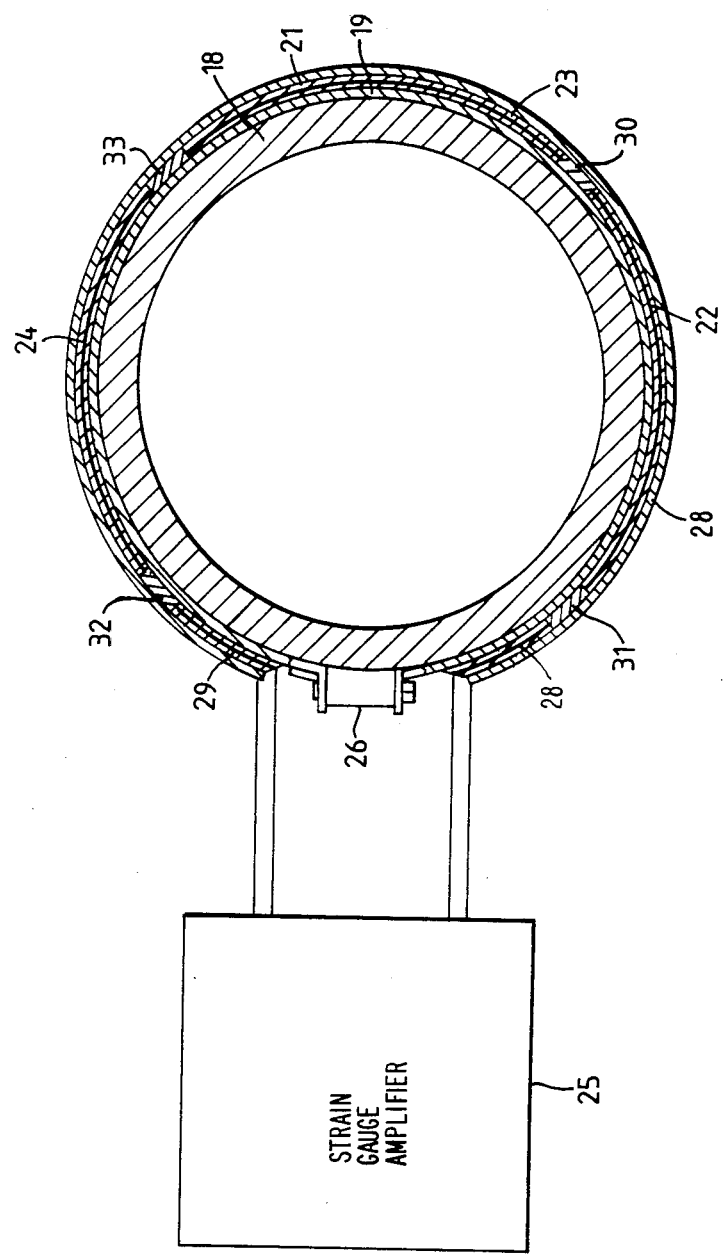

DETECTION OF STEP CHARGES OF PRESSURE IN VESSELS AND APPARATUS THEREFOR

This invention relates to a method and apparatus for leak detection in vessels, for example pipelines.

When a leak occurs in a fluid filled vessel a pressure drop occurs in the fluid. The drop in pressure continues as long as the leak continues and is transmitted up stream and down stream at the velocity of sound in the fluid from the position of the leak as a step change in pressure which may however, in the case of a minor leak be of small magnitude; for example, it may be of the order of 0.1% of the total pressure in the vessel. It is known to check for the occurrence of a leak by monitoring such changes and it is also known to estimate the position of a leak by providing two or more pressure monitoring stations along a pipeline, and estimating the position of a leak at a point between the stations from the times of arrival of the step change in pressure propagated from it.

The pressure monitoring stations in use have involved the insertion of pressure detectors through the walls of the vessel. This has involved considerable expense and some likelihood of leaks occuring if defects occurred in the mounting or sealing of the pressure detector. Installation or replacement of the pressure detectors is also difficult or impossible if the vessel is in use.

This invention comprises novel detectors for monitoring step changes of pressure in a vessel which comprises means outside the vessel for detecting a change in the dimensions of the vessel and a filter adapted to pass from the said means substantially only signals characteristic of dimensional changes resulting from a fall in pressure in the vessel ocurring at a minimum rate of 0.005 and preferably 0.01 bars per second which is not followed by a rise in pressure at that minimum rate within 0.05 seconds. Preferably the filter rejects signals of frequency greater than 20 Hz and more preferably those greater than 10 Hz or 4 Hz in order to eliminate interference, and suitably means is provided to ignore signals below a threshold amplitude. Suitably the filter passes signals in the range 0.1 to 20, preferably 0.1 to 10 and more preferably 0.1 to 4 Hertz.

The means for detecting a change in the dimensions of the vessel may be an acelerometer monitoring acceleration of the wall of the vessel, means to sense changes in the resonant properties of the vessel consequent on dimensional changes, or means to detect changes in curvature of the vessel, for example means to detect changes in light loss in an optical fibre on the surface of the vessel consequent on changes in its curvature, but is preferably a strain gauge adapted to sense changes in the circumference of the vessel.

The detectors may be used in conjunction with a leak detecting system which comprises a signal processing system adapted to measure the amplitude of a signal from the detectors and to give an alarm in response to signals of greater than the predetermined magnitude. If two or more detectors are provided at successive stations along a pipeline the signal processing system may comprise means for similarly processing signals from both detectors and for producing a signal indicating the position of a leak in response to the time relationship between the detected signals.

Apparatus according to the invention suitably comprises one, two or more strain gauges secured to the external surface of the vessel. A signal indicating changes in the circumference of the vessel may be obtained by securing one or more strain gauges to small sectors of the vessel. The strain gauges preferably cover substantially the whole of the circumference of the vessel. The gauges are suitably connected in series across a strain gauge amplifier. Preferably four or more gauges positioned diametrically opposite to one another are used in order to minimise mechanical interference. They are suitably of the piezo resistive semiconductor strain gauge type and the strain gauge amplifier then measures the resistance across the set of strain gauges and supplies an output signal to the filter as aforesaid.

The strain gauges are suitably surrounded by an electrostatic shield for example a shield of aluminium foil, and are suitably secured to the pipe. Suitably the electrostatic shield is bonded to the strain gauges with an adhesive.

Figure 2:
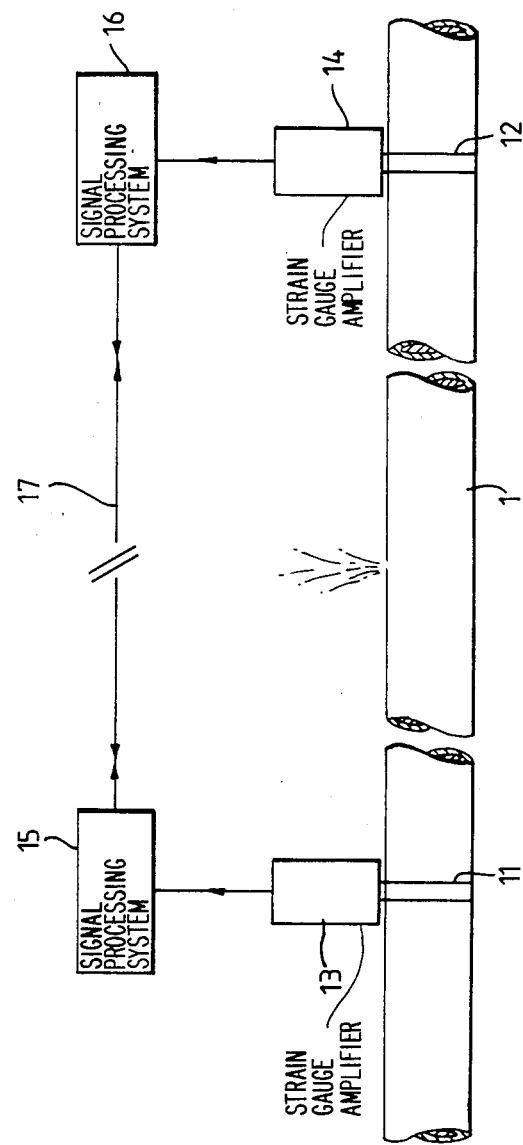

The invention will now be described with reference to the accompanying drawings of which FIGS. 1 and 3 show a cross section through a pipe which is equipped with detectors according to the invention and FIG. 2 shows a schematic representation of a test system according to the invention.

FIG. 1 shows a cross section through a pipe 1 which is surrounded by four strain gauges 2, 3, 4 and 5 of the piezo resistive semiconductor type connected in series across strain gauge amplifier 6, which provides an output signal in response to the resistance across the strain gauges. Strain gauges 2, 3, 4 and 5 are bonded to the surface of the pipe 1 with an epoxy adhesive and are surrounded by an aluminium foil electrostatic shield 7 which is bonded to the strain gauges with an epoxy adhesive. The individual sections of the shield are electrically connected by wires 8, 9 and 10. The shield may alternatively be made continuous.

FIG. 2 shows a pipeline 1 and detectors 11 and 12 as described with reference to FIG. 1. The outputs from strain gauge amplifiers 13 and 14 are fed to signal processing systems 15 and 16 which contain 0.1 to 4 Hz band pass filters which are linked by a connection 17.

The apparatus operates as follows:

In normal operation the resistance from the strain gauges fluctuates at frequencies outside the 0.1 to 4 Hertz range and the signal processing filter rejects such fluctuations. If, however, a leak occurs between the detectors a pressure drop originating at the leak is transmitted as a front to both detectors. The filter transmits a signal proportionate to the pressure drop as an exponentially decaying sine wave to each signal processing system. The time of arrival of the signals is compared by the signal processing systems which may optionally allow for the flow of fluid in the pipe and which produce a signal in response to the time interval detected indicating the position of the leak.

Means may be provided for rejecting exponentially decaying sine waves of less than a predetermined amplitude in order to avoid producing leak indications when other pressure fluctuations associated with normal pipeline operation occur.

For ease of assembly on existing vessels it is convenient to provide a band for clamping round the vessel and to mount the means for detecting changes in dimensions of the vessels on it. By this means a good bond may be secured between the said means and the band under controlled condition. The band is then clamped around the vessel.

Suitably the band may be a jubilee clip. The means for detecting changes in dimensions of the vessel may be surrounded by a potting compound to protect it from moisture and impact, and if desired an electrostatic shield may be provided to surround the assembly also; this may be integral with the band or may be added afterwards.

This form of the invention is shown in FIG. 3 which shows a cross section through a pipe 18 around which is secured a jubilee clip 19 to which is securely bonded by an epoxy adhesive four strain gauges 30, 31, 32 and 33. The strain gauges are embedded in the jubilee clip circlet is surrounded by a band of flexible potting resin 21 and are electrically connected in series by wires 22, 23, 24, 28 and 29 which lie in the resin, across strain gauge amplifier 25. The jubilee clip is secured round pipe 18 using the tightening screw assembly 26. Electrostatic shield 27 surrounds the band of flexible resin.

This form of the invention may be operated in an analagous manner to that of the device previously described with reference to FIGS. 1 and 2.

Leaks from the pipeline produce falls in pressure in the pipeline occurring at a minimum rate of 0.005 bars per second, which is not followed by a rise in pressure at that minimum rate within 0.05 seconds.

We claim:

1. A detector for monitoring step changes of pressure in a vessel which comprises means outside the vessel for detecting a change in the dimensions of the vessel, said means being mounted on a jubilee clip for clamping around the vessel and said means being surrounded by a potting compound to protect it from moisture and impact; and a filter adapted to pass from the said means substantially only signals characteristic of dimensional changes resulting from a fall in pressure of the vessel occurring at a minimum rate of 0.005 bars per second which is not followed by a rise in pressure at that minimum rate within 0.05 seconds.

2. A detector as claimed in claim 1 in which the filter passes only signals in the range 0.1 to 4 Hertz.

3. A detector as claimed in claim 2 which comprises four or more strain gauges positioned diametrically opposite one another.

4. A detector as claimed in claim 2 which comprises strain gauges surrounded by an electrostatic shield.

5. A detector as claimed in claim 1 in which the means outside the vessel for detecting a change in the dimensions of the vessel comprises one or more strain gauges adapted to sense changes in the circumference of the vessel.

6. Vessels comprising detectors for leaks as claimed in claim 1.

7. Apparatus for detecting leaks in pipelines which comprises two or more detectors each including means outside the pipeline for detecting a change in the dimensions of the pipeline and a filter adapted to pass from said means substantially only signals characteristic of dimensional changes resulting from a fall in pressure in the pipeline occurring at a minimum rate of 0.005 bars per second which is not followed by a rise in pressure at that minimum rate within 0.05 seconds, said detectors being situated at successive stations along the pipeline; and means for processing signals from both detectors and for producing a signal indicating the position of a leak in response to the time relationship between the detected signals.

* * * * *